June 20, 1944.   S. WULFF   2,351,651
INDEPENDENT WHEEL SUSPENSION
Filed March 1, 1941   2 Sheets-Sheet 1

INVENTOR
Siegfried Wulff
BY
ATTORNEYS

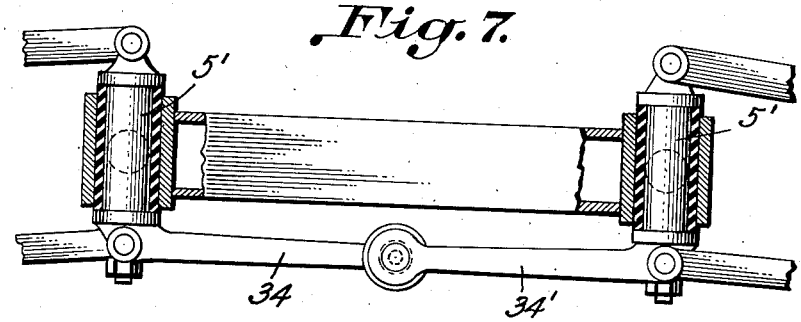
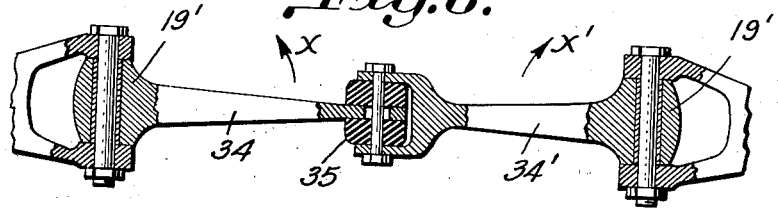
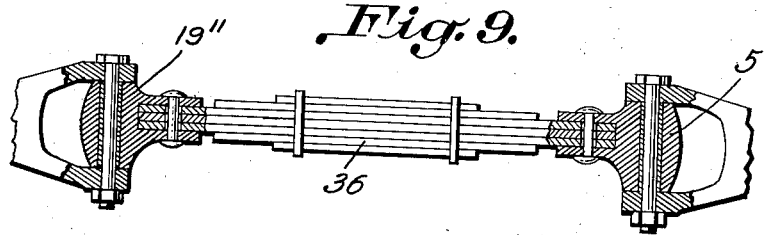
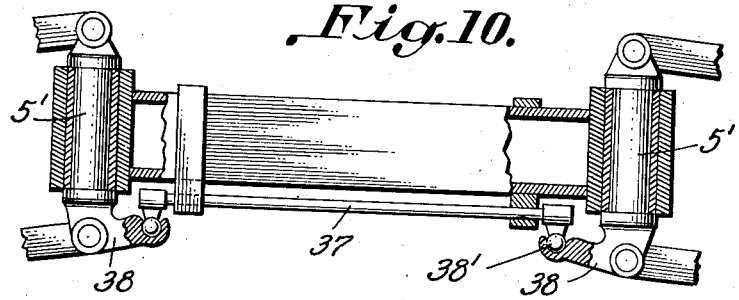

Patented June 20, 1944

2,351,651

UNITED STATES PATENT OFFICE 2,351,651

INDEPENDENT WHEEL SUSPENSION

Siegfried Wulff, Stuttgart-Bad Cannstatt, Germany; vested in the Alien Property Custodian Application March 1, 1941, Serial No. 381,314
In Germany February 12, 1940

18 Claims. (Cl. 267—20)

The present invention relates to an independent wheel suspension capable of yielding about a substantially vertical axis. More particularly, the invention relates to an independent wheel suspension of a pair of wheels, especially wheels of a motor car in which the suspension of at least two wheels may somewhat yield relatively to the frame about a substantially vertical axis. The invention substantially consists in supporting the wheel suspensions against each other in the direction of rotation about the vertical axis. The supporting, for example, may be effected by connecting together the supporting members of a pair of wheels, the supporting members being yieldably mounted about a substantially vertical axis of rotation and serving for mounting the wheel suspension members, such as two guide links arranged one above the other, the supporting members being rigidly connected to each other in the direction of rotation by a transverse member somewhat resilient in itself. The transverse member preferably is arranged substantially in the plane extending through the vertical axis of rotation of the two supporting members.

In a particularly suitable construction one or more flat irons or spring leaves, arranged substantially horizontally and therefore under strain of bending acting along their edges, are provided for connecting to each other and sustaining the supporting members about their vertical axes of rotation.

Such a sustaining of the supporting members for the wheel suspension resiliently mounted at the vehicle, preferably at the frame, has the advantage that the frame will substantially be released of all forces acting in their horizontal plane upon the wheels and thereby upon the supporting members, and that additional bending moments are obviated, which occur at other points of the frame by sustaining the supporting pivots in a horizontal plane. Simultaneously the strains acting in a horizontal plane upon both wheel suspensions of a pair of wheels are rendered more uniform which is particularly favorable in case of steered wheels. The sustainment of the supporting members by one or several horizontally arranged spring leaves, moreover, results in the most simple sustainment and simultaneously in a particular low weight.

The invention, moreover, relates to a wheel suspension in which the supporting members for the wheel suspension, arranged at both sides of the longitudinal central plane of the vehicle in a manner capable of elastically yielding in all directions, for example substantially vertical supporting pivots each serving for mounting two guide links—or at least one of them—arranged one above the other, are supported against each other by two transverse members located one above the other. Thereby the two oppositely arranged supporting pivots are sustained with regard to each other in the manner of a parallelogram so that the forces occurring at the one supporting pivot simultaneously are absorbed by the other supporting pivot also. Thereby the supporting pivots as well as the frame are in an advantageous manner released from all strains occurring. The result of wheel pressures and shocks acting in a vertical direction upon the wheels is such that the upper transverse member substantially is under strain of compression and the lower transverse member substantially is under strain of tension. Preferably at least one of the transverse members simultaneously serves the purpose of sustaining the supporting members with regard to each other in horizontal direction. To this end one of the two transverse members, more particularly the lower transverse member, preferably is resilient in itself and rigidly coupled to the supporting members in the direction of rotation about a vertical axis, whereas the other, particularly the upper transverse member, may in the direction of rotation be linked or resiliently connected to the supporting members. The latter hereby simultaneously may serve for mounting the motor or other elements of the vehicle, e. g. of the differential.

In the accompanying drawings some embodiments of wheel suspensions according to the invention are shown by way of example.

In the drawings:

Fig. 7 is a detail front elevation, with parts in section, of a modified form of pivot mounting.

Fig. 8 is a bottom plan view, with parts broken away and shown in section, of the modification shown in Fig. 7.

Fig. 9 is a view similar to Fig. 8, showing a modified form of resilient connecting means between the pivots, and Fig. 10 is a view similar to Fig. 7, showing a further modified form of resilient connection between the pivots.

Figure 1:
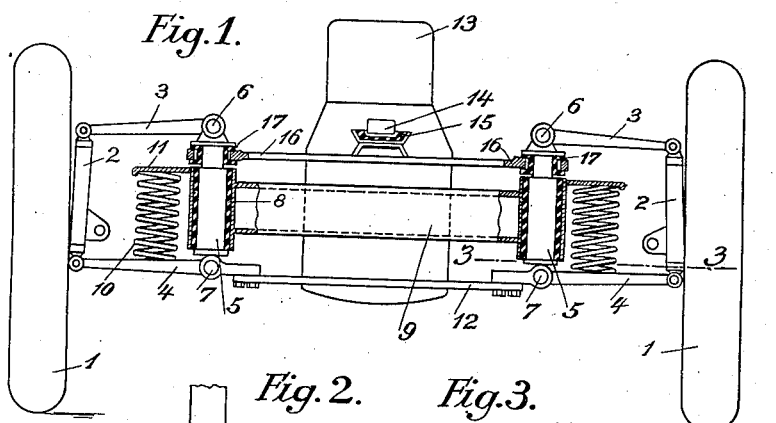
Fig. 1 is a diagrammatic view of a front axle according to the invention.

In the construction shown in Fig. 1, the dirigible wheels 1 are carried by the wheel supports 2 which are connected by an upper link 3 and a lower link 4 as well as by joints 6 and 7 respectively to a vertical supporting pivot 5. The latter is mounted by means such as a rubber sleeve 8 in the frame 9 of the vehicle, the rubber sleeve allowing yielding of the supporting pivot mainly about its vertical axis, but also in another direction. To provide the wheel with springs, a coiled spring 10, for example, is provided which is not guided and the ends of which on the one hand bear against the lower link 4 and on the other hand against a bearing bracket 11 provided, for example, at the frame. To absorb the forces which tend to swing the wheel suspension about the axis of the supporting pivot 5, a flat iron or leaf spring 12 which in a horizontal plane is somewhat resilient, is provided, which connects the two supporting pivots 5 to each other at both sides of the longitudinal centre plane of the vehicle and preferably is arranged in the plane of these supporting pivots.

According to the invention the motor 13, moreover, is mounted upon a transverse member 16, for example, by a front bearing eye 14 and an interposed rubber buffer 15. The transverse member 16 connects the upper ends of the supporting pivots 5 to each other. Between the transverse member 16 and the supporting pivots 5 other rubber blocks 17 are provided, which allow the required freedom of movement between the supporting pivots 5 and the motor. The transverse member 16 also preferably is somewhat elastic, more particularly capable of being elastically bent, whereby the mutual influencing of motor and wheel suspension is further reduced. To increase the resiliency the transverse member 16 may correspondingly be curved instead of being straight lined.

Figure 2:
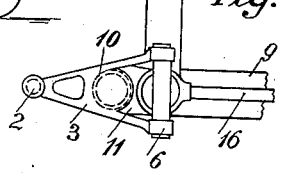
Fig. 2 shows a plan view of the means for guiding the left-hand wheel.
Figure 3:
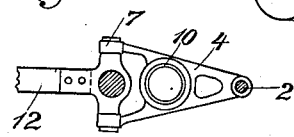
Fig. 3 is a plan view in section on the line 3—3 of Fig. 1 showing the means for guiding the right-hand wheel.
Figures 4, 5, 6:
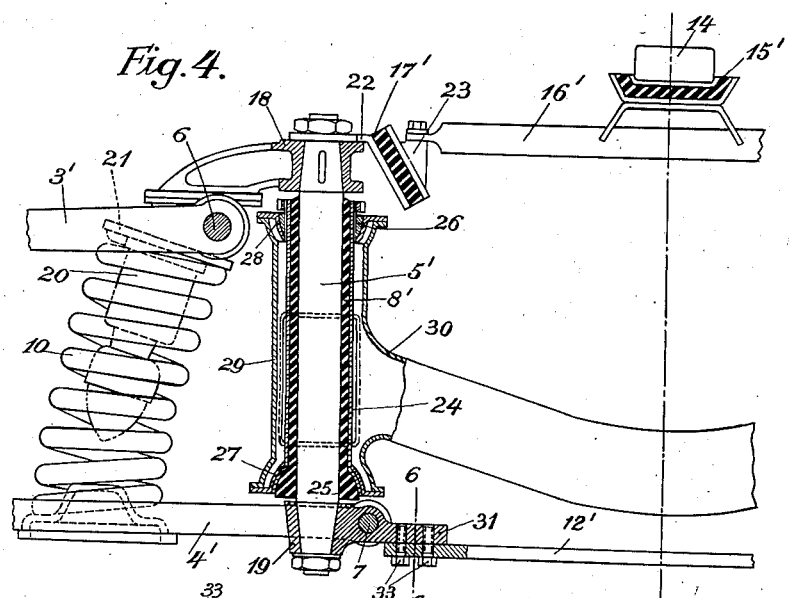
Fig. 4 shows a modification of a wheel suspension according to the invention on a larger scale and partially in section.
Fig. 5 is a plan view of the one end of a transverse member to be described later.
Fig. 6 is a section on the line 6—6 of Fig. 4.

In the modification shown in Fig. 4, the elements also illustrated in Figs. 1-3 are designated with the corresponding reference characters used in Figs. 1-3 for such elements. In this case the two bearing members 18 and 19 are rigidly mounted upon the supporting pivots 5'. The bearing member 18 serves for mounting the upper link 3' and the bearing member 19 for mounting the lower link 4'. Moreover, a shock absorber 20 as well as an abutment 21 for the coiled spring 10 are arranged at the upper bearing member 18.

Fixed upon the upper end of the supporting pivot 5' is an angle iron 22 which by way of the interposed rubber block 17' is adherently connected to another metal member 23. Connected to the latter is the transverse member 16' which is capable of being elastically bent and which is carrying the motor. The arrangement hereby is such that the rubber block 17' of substantially rectangular cross section is between the connecting surfaces obliquely inclined downwardly towards the central longitudinal plane of the vehicle. The forces due to the weight of the motor or other forces acting in a vertical direction, therefore, substantially are absorbed by the rubber blocks 17', whereas the rubber block 15' which, for example, in a manner known per se, also is arranged between metal elements and adherently connected to the latter, allows substantially torsional vibrations of the motor about its longitudinal axis. Vertical vibrations are, moreover, absorbed by the transverse member 16' capable of being somewhat elastically bent. The resilient members 15', 16', and 17' arranged between the motor 13 and the supporting pivots 5' are of sufficient resiliency in the horizontal direction to allow the required yielding of the supporting pivot 5', particularly the yielding about the vertical axis of the pivot, and to prevent shocks occurring at the wheel suspension to be transferred to the motor, which would be highly undesired.

To ensure a safe mounting of the supporting pivot 5' on the frame, while allowing an adjustment, the rubber sleeve 8' surrounding the supporting pivot is inserted in a metal sleeve 24 which by means of a ball-like end surface 25 and a ball-like intermediate ring 26 respectively bears against ball-like bearing caps or covers 27 and 28 which are mounted upon the open ends of a vertical frame sleeve 29. The latter in turn is arranged at the point of connection of a transverse beam 30 of the frame to a longitudinal beam of the frame which, for example, may also be of tube- or box-like form. The frame sleeve 29 is welded to these frame beams to form a solid unit with same.

As may be seen from Fig. 4, the lower transverse member 12', formed as a flat iron or as a spring leaf and serving to sustain the two supporting pivots relatively to each other, is rigidly connected to the bearing member 19 for the lower guide link 4'. Accordingly the bearing member 19 has an inwardly directed flange 31, the lower surface of which is at 32 toothed or chequered in the longitudinal direction of the transverse member 12'. The end of the transverse member 12' also is correspondingly toothed or chequered. By screws 33 the transverse member 12' is strongly pressed against the flange 31 of the bearing member 19 so that by means of the toothed or chequered part 32 a rigid coupling between these two parts is obtained in the direction of rotation about the axis of the supporting pivot 5'.

Yielding of the wheel suspension about the vertical axis of the supporting pivot 5', therefore, is possible only by a bending of the transverse member 12' in a horizontal plane, i. e. by bending forces acting along the edges of the spring leaf 12'.

Thereby the required relatively slight resiliency of the wheel suspension in a horizontal plane is ensured on the one hand, and too large a resiliency in this plane, however, is prevented on the other hand.

By the use of a spring leaf for supporting, a particular low weight and a special large simplicity of the supporting members is obtained.

As the two supporting pivots 5' are directly sustained with regard to each other by means of the transverse member 12', the frame is released from the supporting forces of the wheel suspension in the horizontal plane.

The arrangement of the lower transverse member 12' and the upper transverse member 16' effects supporting of the two oppositely arranged elastically arranged supporting pivots 5' in the manner of a parallelogram, so that under the action of the wheel pressure the upper transverse member 16' is under strain of compression, whereas the lower transverse member 12' is under strain of tension.

If desired, the supporting pivots may be sustained with regard to each other about vertical axes by separate supporting arms for each of the supporting pivots, for example, in such a manner that the bearing member 19 of the left-hand supporting pivot bears against the bearing member 19 of the right-hand supporting pivot and vice versa, rubber being interposed between the bearing member and the corresponding connecting member (12'). In Figs. 7 and 8 is shown such a construction, the lower connecting member being formed of arms 34 and 34' connecting respectively to the bearings 19' of the pivots 5' and yieldably interconnected with one another by the rubber buffers 35. It will be seen that this type of connection permits a yielding movement of the pivots 5' about a vertical axis in the directions of the arrows $x$ and $x'$. Instead of a spring leaf capable of being bent along its edges, any other suitable resilient device, for instance a sufficiently stiff leaf spring with vertically arranged spring leaves. In Fig. 9 is shown such construction with a leaf spring 36 provided with vertically arranged spring leaves between bearings 19". A torsional spring mounted on the frame may be used which by means of suitably interconnected lever arms are actuated by the supporting pivots resiliently mounted about a vertical axis of rotation in such a manner that a rotation of the one supporting pivot tends to effect rotation of the other supporing pivot in opposite direction.

In Fig. 10 is shown such construction, with a torsion rod 37 provided at its ends with downwardly extended arms having spherical extremities fitting into sockets at the inner extremities of arms 38 on the pivots 5'. Movements of the pivots will act to twist the torsion rods 37, thus bringing about yieldable resistance to the turning of the pivots.

Having now particularly described and ascertained the nature of my said invention and in what manner the same is to be performed I declare that what I claim is:

1. An independent wheel suspension of at least two wheels for vehicles comprising for each wheel a wheel support, two guiding links, at least one of these being rotatably connected to a supporting member, this latter being elastically mounted on the vehicle, the supporting members being connected to each other by resilient members, at least one resilient member being used for each pair of supporting members, the connection between the resilient member and the supporting members being rigid against torsion, at least one of said resilient members comprising a spring leaf horizontally arranged and stressed along its edges, connecting the supporting members.

2. An independent wheel suspension of at least two wheels for motor vehicles comprising for each wheel a wheel support, two guiding links, at least one of these being rotatably connected to a supporting pivot, this latter being elastically mounted on the frame of the vehicle, the supporting pivots being connected to each other by two transverse members, one being rigidly connected to the supporting pivots and resilient in itself, the other being oscillatable relatively to the supporting pivots.

3. A wheel suspension as set forth in claim 2, the connection between the rigidly connected resilient member and the support pivots being also rigid against torsion.

4. An independent wheel suspension of at least two wheels for vehicles comprising for each wheel a wheel support, two guiding links, at least one of these being rotatably connected to a supporting pivot, this latter being elastically mounted on the frame of the vehicle, the supporting pivots being connected to each other by transverse members, one being rigidly connected to the supporting pivots and resilient in itself, the other being oscillatable relatively to the supporting pivots, the connection between at least one of the transverse members and the supporting pivots being rigid against torsion, at least one of said transverse members comprising a spring leaf horizontally arranged and stressed along its edges, connecting the supporting pivots.

5. An independent wheel suspension of at least two wheels for vehicles comprising for each wheel a wheel support, two guiding links, at least one of these being rotatably connected to a supporting pivot, this latter being elastically mounted on the frame of the vehicle, the supporting pivots being connected to each other by transverse members, one being rigidly connected to the supporting pivots and resilient in itself, the other being oscillatable relatively to the supporting pivots, the connection between at least one of the transverse members and the supporting pivots being rigid against torsion, at least one of said transverse members comprising a spring leaf horizontally arranged and stressed along its edges, connecting the supporting pivots, the other transverse member being arranged in spaced relation above said spring leaf transverse member, and the supporting pivots being mounted in rubber on the vehicle.

6. An independent wheel suspension of at least two wheels for motor vehicles comprising for each wheel a wheel support, two guiding links, at least one of these being rotatably connected to a supporting pivot, this latter being elastically mounted on the frame of the vehicle, the supporting pivots being connected to each other by two transverse members, one being rigidly connected to the supporting pivots and resilient in itself, the other being resiliently connected in direction of rotation to the supporting pivot.

7. A wheel suspension as set forth in claim 6, the connection between the rigidly connected transverse member and the supporting pivots being also rigid against torsion.

8. An independent wheel suspension of at least two wheels for vehicles comprising for each wheel a wheel support, two guiding links, at least one of these being rotatably connected to a supporting pivot, this latter being elastically mounted on the frame of the vehicle, the supporting pivots being connected to each other by transverse members, one being rigidly connected to the supporting pivots and resilient in itself, the other being resiliently connected for oscillation relatively to the supporting pivots, the connection between at least one of the transverse members and the supporting pivots being rigid against torsion, at least one of said transverse members comprising a spring leaf horizontally arranged and stressed along its edges, connecting the supporting pivots.

9. An independnet wheel suspension of at least two wheels for vehicles comprising for each wheel a wheel support, two guiding links, at least one of these being rotatably connected to a supporting pivot, this latter being elastically mounted on the frame of the vehicle, the supporting pivots being connected to each other by transverse members, one being rigidly connected to the supporting pivots and resilient in itself, th other being oscillatable relatively to the supporting pivots, the connection between at least one of the transverse members and the supporting pivots being rigid against torsion, at least one of said transverse members comprising a spring leaf horizontally arranged and stressed along its edges, connecting the supporting pivots, the other transverse member being arranged in spaced relation above said spring leaf transverse member, and the supporting pivots being mounted in rubber on the frame.

10. In a vehicle having a frame, a pair of wheel supports, wheels on said support, a pair of supporting members on said frame, guiding means, one respectively connected between each supporting member and its corresponding wheel support, means for mounting each supporting member on said frame for yielding movement about a substantially vertical axis, whereby each wheel support and guiding means moves about said axis with its supporting member as a unit, and means for resiliently interconnecting said supporting members at a plurality of points so that the movement of one supporting member is resiliently resisted by the other.

11. The combination according to claim 10, in which said interconnecting means comprises a resilient member rigidly connected to said supporting members.

12. In a vehicle having a frame, a pair of wheel supports, wheels on said supports, a pair of supporting members on said frame, guiding means, one respectively connected between each supporting member and its corresponding wheel support, means for mounting said supporting members on said frame for yielding movement about a substantially vertical axis, whereby each wheel support and guiding means move as a unit with each of its supporting member about said axis, and a horizontally arranged leaf spring rigidly interconnected between said supporting members, whereby movement of said supporting members about a vertical axis is resisted by bending of the leaf spring in a horizontal plane.

13. In a vehicle having a frame, a pair of wheel supports, wheels on said support, a pair of supporting members on said frame, guiding means, one respectively connected to each supporting member and its corresponding wheel support, means for mounting said supporting members in said frame for yielding movement about a subtantially vertical axis, and two transverse members positioned substantially one above the other and each yieldably interconnecting said two supporting members, whereby said two supporting members and said two transverse members form a quadrilateral lying in a substantially vertical plane and yieldable substantially independently of the frame.

14. The combination according to claim 13, in which one of said transverse members is formed as a resilient member rigidly interconnected to the supporting members, and means for connecting the other transverse member to said supporting members for yieldable movement about a substantially vertical axis.

15. The combination according to claim 13, in which said supporting members comprise substantially vertical pivots, the ends of which are connected to each other by said transverse members, one of said transverse members comprising a resilient member rigidly connected to the end of said pivot, and means for connecting the other transverse member to the other end of said povot for yieldable movement about a substantially vertical axis.

16. The combination according to claim 13, in which one of said transverse members comprises a horizontally positioned spring rigidly interconnected to said supporting member.

17. The combination according to claim 10, in which the means for yieldably mounting said supporting members on said frame include rubber supports.

18. The combination according to claim 13, in which the means for yieldably mounting said supporting members on the frame include rubber supports.

SIEGFRIED WULFF.